April 6, 1954 J. T. POTTER 2,674,728

THREE-DIMENSIONAL MEMORY DEVICE

Filed April 26, 1949 3 Sheets-Sheet 1

INVENTOR.
John T. Potter

BY

Moser, Nolte, Arens & Berry
ATTORNEYS

April 6, 1954 J. T. POTTER 2,674,728

THREE-DIMENSIONAL MEMORY DEVICE

Filed April 26, 1949

3 Sheets-Sheet 2

INVENTOR.
John T. Potter

BY

Moses, Nolte, Crews & Berry
ATTORNEYS

April 6, 1954 J. T. POTTER 2,674,728

THREE-DIMENSIONAL MEMORY DEVICE

Filed April 26, 1949 3 Sheets-Sheet 3

INVENTOR.
John T. Potter
BY
Moses, Nolte, Crews & Berry
ATTORNEYS

Patented Apr. 6, 1954

2,674,728

UNITED STATES PATENT OFFICE 2,674,728

THREE-DIMENSIONAL MEMORY DEVICE

John T. Potter, Great Neck, N. Y.

Application April 26, 1949, Serial No. 89,657

7 Claims. (Cl. 340—174)

This invention is concerned with cataloging or filing devices, and in particular with what may be termed three-dimensional memory devices. The present application is in the nature of a continuation-in-part of my copending application Serial No. 47,292, filed September 1, 1948, now Patent No. 2,620,389, for Three-Dimensional Selector and Memory Device.

The filing and cataloging of information is becoming an increasingly complex problem because of the scope and variety of accounts and merchandise handled by modern organizations. Mail order houses, for instance, handle thousands of items. The manual handling of thousands of daily orders for these items is for these people a problem of major importance.

The application of electronics to the problem as set forth in my pending applications constitutes a major step in the solution of the problem. The devices disclosed in said applications may, for example, catalog ten thousand items and expeditiously select information about each, under the control of two simple and fast coordinate selectors.

The present system has to do with improvements in the basic system and the practical organization of apparatus for carrying out the objects of the above identified applications. The invention provides a method and means for speeding up the selection of the desired information.

A primary object is to increase the speed of operation of a three-dimensional memory device.

A further object is to simplify the operation of a three-dimensional electronic memory device.

These and other objects will be apparent from the detailed description of the invention given, in connection with the accompanying drawing which forms a part of this specification.

In the drawing

Figure 1:
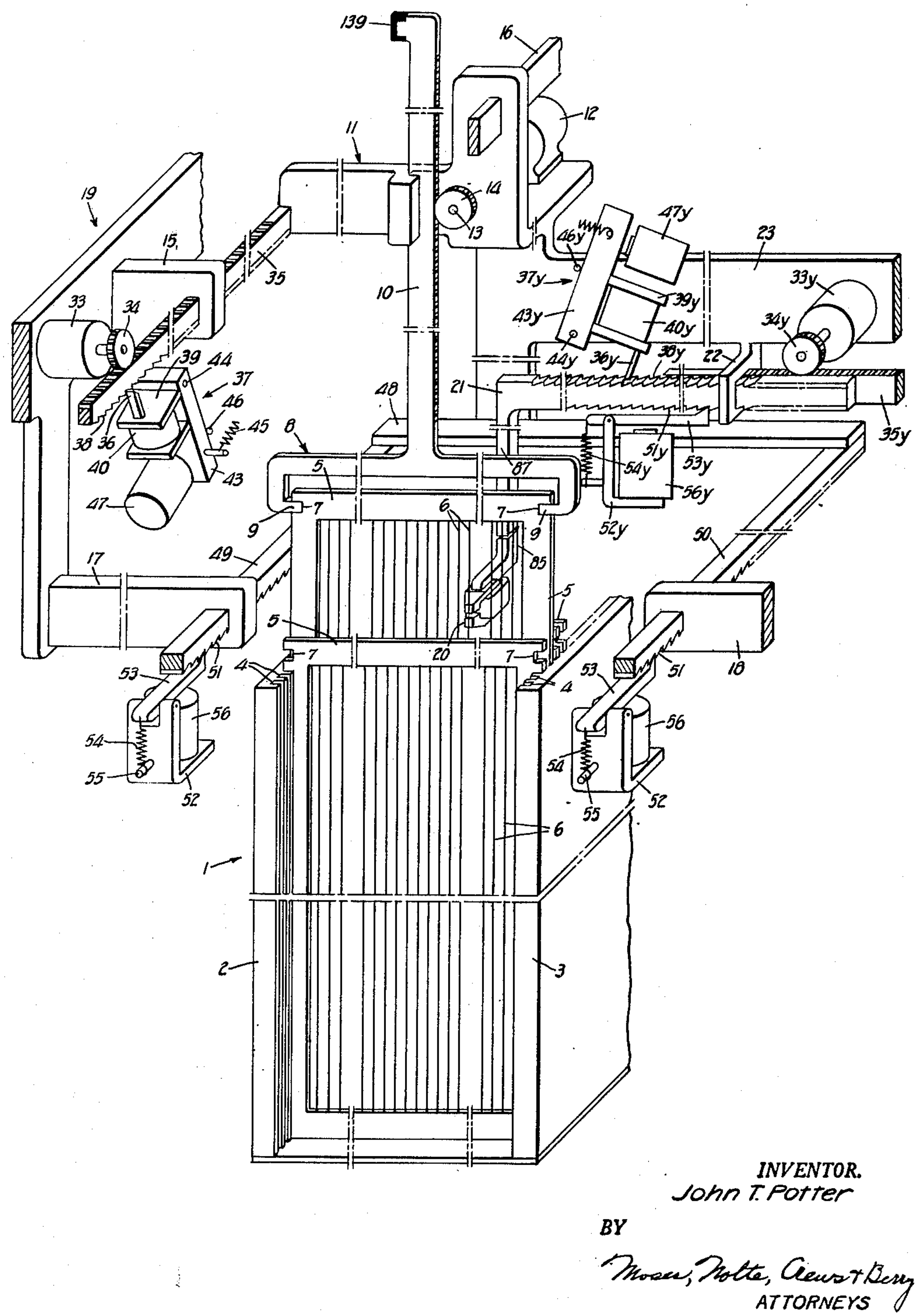
Fig. 1 is a fragmentary perspective view of practical and advantageous illustrative mechanism embodying features of the invention.

In Fig. 1 a magazine I comprises parallel, upright, slotted plates 2 and 3. The slots 4 are formed in confronting faces of the plates and extend vertically in parallel relation to one another. The slots of the plates are paired, each pair of slots being designed to slidingly receive and support a record frame 5. For illustrative purposes it may be assumed that there are one hundred of the record frames 5. Each record frame 5 carries a large number of vertically extending wires 6, which number may illustratively be assumed to be one hundred. The wires are of steel and have magnetic recordings upon them, so that each wire constitutes a sound track. Each record frame 5 has notches 7 formed in opposite ends of its upper margin. In the normal positions of the frames the notches 7 are disposed in two aligned rows, one at either side of the magazine.

A lifting bail 8 having inturned fingers 9 is adapted to be operated in a fore and aft direction to select any frame desired. During such selection the inturned fingers 9 of the bail 8 travel along the lines of notches 7 and come to rest in position to cooperate with the selected frame.

The bail 8 is carried by a rack 10 which is mounted for vertical sliding movement in a main carriage 11. The main carriage 11 carries a motor 12 on whose shaft 13 a pinion 14 is made fast. The pinion 14 meshes with the rack 10 and is driven in opposite directions by the motor 12 to raise and lower the rack. The rack 10 and the bail 8 jointly form a record frame lifter.

The main carriage 11 is supported for fore and aft horizontal movement upon stationary guides 15, 16, 17 and 18 which form parts of a stationary frame 19.

Movement of the main carriage 11 to carry the bail 8 into cooperative relation with a selected frame 5 is also effective to carry the magnetic pick-up 20 into position just above the selected frame. The magnetic pick-up is carried by a sub-carriage 21 which is slidably mounted in guides 22 (one shown) forming part of a main carriage extension 23. The sub-carriage 21 is adapted to be operated widthwise of a frame to locate the pick-up 20 just above a selected wire of the frame.

The description thus far given is equally applicable to the present illustrative mechanism, and to the illustrative mechanism of Figs. 1 to 5 of Serial No. 47,292. Novel operating, arresting and selecting mechanism is, however, employed in the present illustrative construction.

For effecting selection of the frames and selection of the wires, coordinate selectors are employed each comprising a predetermined electronic counter 24 (see Fig. 2) of the kind disclosed and claimed in my pending application Serial No. 657,581, filed March 27, 1946, now Patent No. 2,574,283, for Predetermined Electronic Counter.

This counter may comprise two stationary decimal denomination dial wheels 25 and 26, each having ten divisions marked from zero to 9, and manually settable pointers 25a and 26a mounted on shafts 25b and 26b, and operated by knobs 25c and 26c.

It is characteristic of this counter that if, starting with the mechanism in the zero or normal condition, the decimal wheels are individually set to any desired combination, the number indicated by the wheels will be instantaneously and automatically set up in the counter mechanism upon the application of a single impulse over conductors 27 and 28, which may be supplied from a conductor 29 upon the mere instantaneous closing of a switch 30. Once that initial count is set into the apparatus, the mechanism will automatically count impulses as fast as they are received until the capacity of the counter is exhausted, the capacity in this instance being 100. As the counter passes from 99 to 00 an output circuit of the predetermined counter comprising conductors 31 and 32 is deenergized. Assuming that it is the main carriage that we are now dealing with, although the control mechanism for the sub-carriage is similar, the attainment of the predetermined count (corresponding to the differences between 100 and the decimal wheel setting) results in an arresting of the main carriage and a discontinuance of the supplying of impulses to the counter, as will now be made clear.

The main carriage 11 (Figs. 1 and 2) is driven from a motor 33, fixed on the frame 19, through a pinion 34 and a rack 35, the rack forming part of the main carriage 11. As the operation proceeds from the starting position, a finger 36 forming part of an impulse transmitter 37 is caused to bear yieldingly against and ride over the teeth 38 formed on the lower surface of the rack 35. An impulse is transmitted for each tooth passed over. There is one impulse-producing tooth for each frame 5, the spacing of the teeth being the same as the spacing of the frames, so that each frame traversed is represented by an impulse transmitted to the counter.

The finger 36 is movably mounted upon a form 39 which carries a coil 40. The finger 36 may be magnetized or may be connected to a suitable electromagnet for inductively generating a single impulse in the coil 40 each time that it snaps over a tooth of the toothed face 38. The impulses generated in the coil 40 are transmitted through conductors 41 and 42 to the predetermined counter 24.

The impulse generator 37 is mounted upon an arm 43 which is supported on a pivot pin 44 carried by the stationary frame 19. A spring 45 tends to draws the arm 43 in a counter-clockwise direction (Fig. 2) against a fixed stop 46. Whenever the count in the predetermined counter is anything other than 00, however, the circuit through the conductors 31 and 32 is energized, and this causes an electromagnet 47 to be energized. The electromagnet 47 draws the arm 43 toward itself and maintains the finger 36 in contact with the toothed face 38 of the rack 35.

As the counter passes from 99 to 00, however, the electromagnet 47 is deenergized and the spring 45 is permitted to hold the finger 36 away from the toothed face 38 and to maintain it clear of the teeth until a fresh predetermined count has been set up in the counter.

The main carriage 11 also carries upon an extension plate 48 a pair of toothed bars 49 and 50 (Fig. 1) which are guided, respectively, in the guide members 17 and 18. These bars 49 and 50 are designed to arrest motion of the main carriage 11 with the bail 8 in position to cooperate with the selected frame. Since the bars are duplicates of one another, only one of them, namely, 49 has been illustrated in Fig. 2. Each bar has teeth 51 formed on its lower face at intervals corresponding to the spacing of the frames 5, there being one tooth for each frame. The theeth are slanted so that they are adapted to arrest forward movement of the main carriage when obstructed.

In association with each of the bars 49 and 50 there is mounted upon a stationary bracket 52, carried by the main frame, a rockable pawl 53. The tail of the pawl is normally drawn downward by a spring 54 which is connected to the tail of the pawl and to a stationary pin 55. The tendency of the spring 54 is to swing the sharp nose of the pawl up into engagement with the opposed teeth 51 and thereby to arrest the carriage.

Figure 2:
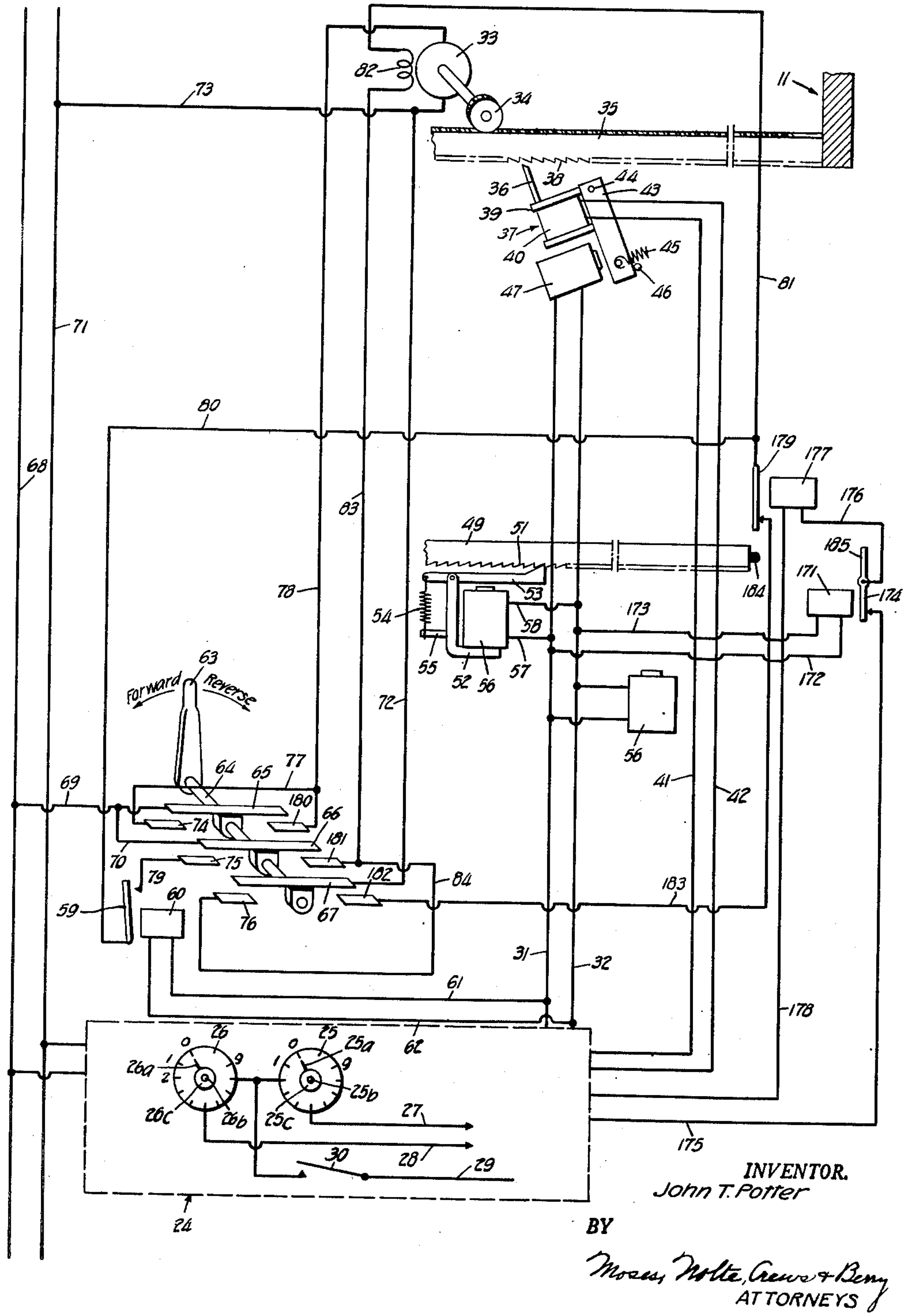
Fig. 2 is a diagrammatic view showing the circuits of either of two coordinate selectors employed in the device.

During the forward travel of the carriage to select the frame an electromagnet 56 carried by the bracket 52 acts upon the pawl 53 to hold it out of engagement with the bar 49. As will be seen from an examination of Fig. 2, the electromagnet is connected through branch conductors 57 and 58 with the conductors 31 and 32. Since the electromagnet is deenergized as the counter passes from 99 to 00, the pawl 53 is made effective at the conclusion of the predetermined count to arrest the main carriage in the selected position. While the electromagnet and the pawl associated with the bar 49 have been described above, it will be understood that the description is equally applicable to the electromagnet and pawl associated with the bar 50 and the same reference characters have accordingly been applied to corresponding parts. In Fig. 2 both electromagnets 56 are shown, but the associated parts such as the bracket 52, pawl 53, spring 54, and teeth 51 are omitted in one instance. To represent the main carriage mechanism accurately all of the parts would be included in duplicate, but to represent the sub-carriage mechanism they and the electromagnet 56 would be included only once, as indicated by Fig. 1.

Forward operation of the motor 33 to select a record frame is made possible by the fact that a switch 59 (Fig. 2) in the forward drive, field circuit of the motor is held closed while this operation is going on. The switch 59 is held closed by an electromagnet 60 which is connected through branch conductors 61 and 62 to the conductors 31 and 32. It will be remembered that the circuit containing conductors 31 and 32 is energized at all times when the predetermined counter has any count in it other than 00.

At the time when the counter dials 25 and 26 have been set and the switch 30 has been closed for an instant, the electromagnet 60 is energized and the switch 59 is closed. At that time a switch handle 63 may be swung counter-clockwise to the position marked "Forward" to set the motor 33 into forward operation. The switch handle 63 is fast on a shaft 64 which carries three conductive switch members 65, 66 and 67. The conductors 65 and 66 are connected to a line conductor 68 through conductors 69 and 70, respectively. The conductor 67 is connected to line conductor 71 through conductors 72 and 73.

Swinging of the switch handle 63 to the forward position carries the switch members 65, 66 and 67 into engagement, respectively, with contacts 74, 75 and 76. Current passing from line conductor 68 over conductor 69 is transmitted through switch member 65, contact 74 and conductors 77 and 78 to the armature of motor 33. From the armature of motor 33, the circuit is completed back to the line 71 through conductor 73.

Engagement of switch member 66 with contact 75 causes a circuit to be closed from line conductor 68 through conductors 69 and 70, member 66, contact 75, a conductor 79, switch member 59, a conductor 80, and a conductor 81 to field winding 82 of the motor 33. From the field winding the circuit is continued over conductors 83 and 84 to contact 76. The circuit is completed through the switch member 67 and conductors 72 and 73 to the line conductor 71.

When, as an incident of the predetermined counter passing from 99 to 00, the circuit including conductors 31 and 32 is deenergized, this results in the deenergization of the electromagnet 60 so that the switch member 59 moves to an open position. The motor is, therefore, deenergized concurrently with the swinging into action of the stop detents 53, and cannot be operated in a forward direction again until a count other than 00 is again set up in the predetermined counter.

When the main carriage 11 has been thus operated through the action of the motor 33 to select a desired record frame, the sub-carriage 21 is next operated through substantially identical mechanism to select a desired wire on the frame. The diagrammatic showing of Fig. 2 may be regarded in every way as applicable to the sub-carriage, the mechanism for operating the main carriage being substantially duplicated for the sub-carriage. In the case of the sub-carriage 21, however, the impulse generator 37*y* (Fig. 1), which is pivoted on pin 44*y* mounted on the extension 23 of the main carriage 11, has its finger 36*y* arranged to cooperate with teeth 38*y* formed in a portion of the upper face of the sub-carriage 21. The sub-carriage 21 includes a rack 35*y*, which is driven through a pinion 34*y* from a reversible motor 33*y*. The arresting pawl 53*y*, pivotally mounted upon a bracket 52*y*, cooperates with stop teeth 51*y* formed on the lower face of the sub-carriage 21. The pawl 53*y* is urged toward engagement with the teeth 51*y* by a spring 54*y*, but is held out of engagement with the teeth by an electromagnet 56*y* while the motor 33*y* is operating in a forward direction.

The impulse generator 37*y* is the same in all respects as the impulse generator 37 save that, as shown, it is mounted in an inverted position. The inversion of the device does not, however, have any influence upon the mode of operation.

When the predetermined counter which controls the operation of the sub-carriage 21 has been set and the motor 33*y* has been operated to move the sub-carriage to a selected position, the pick-up 20 is located to have the selected wire carried past it by the operation of the bail 8, so that the recorded information on the wire can be picked up and transmitted to any suitable utilization mechanism such as a loudspeaker or mechanism controlled by code impulses.

The pick-up 20 (Figs. 1 and 3) is carried upon a support 85, which is pivotally mounted by means of a hinge 86 upon the lower end of an arm 87 which forms part of the sub-carriage 21. The support 85 is urged in a clockwise direction by a spring 88 connected at its opposite ends to said support and to a pin 89 carried by the arm 87. A bracket 90 on the arm 87 supports a coil 91 which forms part of an electromagnet. The armature 92 of the electromagnet is pivotally carried by the pivoted support 85 and extends into the coil. The electromagnet is effective to hold the pick-up 20 back away from its operative position at all times except when the wire 6 itself is actually being drawn past the pick-up head in an upward direction.

In other words, the electromagnet holds the pick-up head back while the carriage and sub-carriage are being operated to effect selections and continues to hold the pick-up out of the way until the bail 8 and the upper margin of the selected frame 5 have moved upward far enough to clear the pick-up. The electromagnet is then de-energized to permit the pick-up to swing forward into close proximity to the selected wire, so that it will be effective to pick-up the information as the wire travels upward. At the completion of the upward travel of the selected record frame, the motor 12 is automatically reversed and the winding 91 is automatically re-energized to pull the pick-up back away from the wire 6 so that no magnetically generated impulses will be transmitted by the pick-up during the restoration of the record frame to its normal position.

Figure 3:
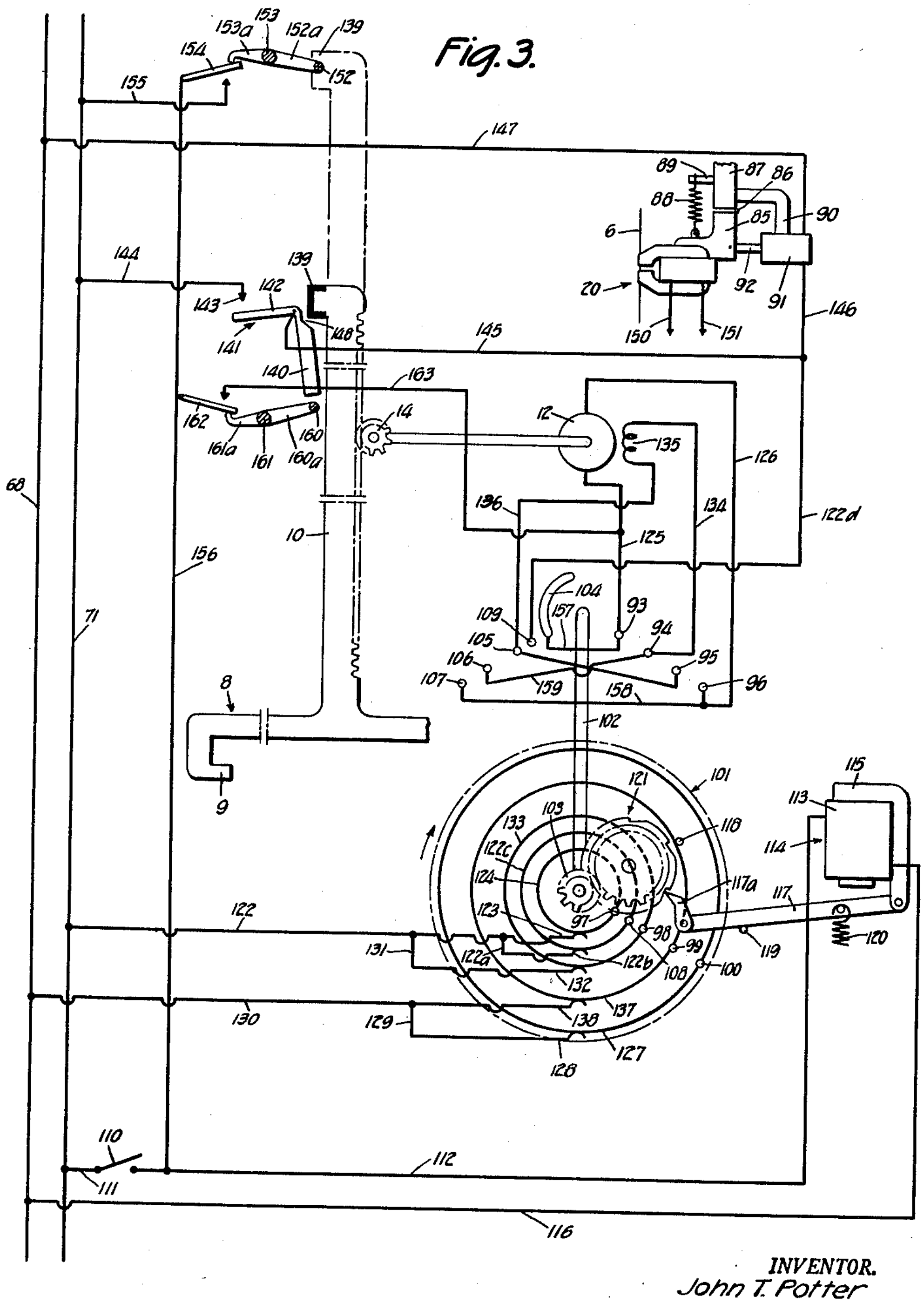
Fig. 3 is a diagrammatic view illustrative of the mechanism for controlling the lifting and restoring of a selected record frame.

The mechanism for effecting these operations is illustrated in Fig. 3. Four radially aligned contacts 93, 94, 95 and 96 are utilized during the lifting operation of the motor 12 in conjunction with four radially aligned contacts 97, 98, 99 and 100 which are carried upon a rotatable contact disk 101. The disk 101 is mounted upon a shaft 102 which has an operating pinion 103 made fast upon it. On the reverse stroke of the rack 10, when the motor 12 is operating in the opposite direction, the motor connections are controlled through the same four contacts 97, 98, 99 and 100 of the disk 101 in cooperation with four stationary contacts 104, 105, 106 and 107. In the last mentioned condition of the parts a fifth contact 108 of the disk 101 cooperates with a stationary contact 109 for the purpose of rendering the pick-up inactive during the down-stroke of the rack 10.

At the time when the two carriages have been operated to effect selection of the frame and wire and the selected frame is to be lifted by the bail 8, the contacts 97, 108, 98, 99 and 100 of the disk 101 stand in vertical alignment above the axis of the shaft 102. At that time a switch 110 is manually closed for the purpose of setting the motor 12 into operation. The switch 110 is connected to a conductor 111 which is connected to line conductor 71. When the switch 110 is closed it connects the conductor 111 to a conductor 112. The conductor 112 is connected to the winding 113 of an electromagnet 114 which is supported upon a bracket 115 fast on the main carriage 11. The winding 113 is connected to line conductor 68 through a conductor 116.

A pawl arm 117 is pivotally mounted on the bracket 115 to operate between positions determined by upper and lower stops 118 and 119. A spring 120 holds the arm 117 in engagement with the lower stop 119 whenever the winding 113 is unenergized, but the arm 117 is drawn upward until arrested by engagement of a pawl 117*a* with the stop 118 whenever the winding 113 is energized. The arm 117 has pivotally mounted upon its outer end the pawl 117a which engages a combined ratchet wheel and gear 121. The teeth of the gear 121 are in mesh with the teeth of the pinion 103 on the shaft 102. Upward movement of the arm 117 produced by energization of the winding 113 is effective to advance the disk 101 clockwise through one-third of a revolution, and hence to carry the contacts 97, 108, 98, 99 and 100 from their position of vertical alignment to the position in which they are illustrated in Fig. 3.

As soon as the disk 101 has been operated, the switch 110 is permitted to open so that the winding 113 is deenergized and the arm 117 is returned to its normal position, the pawl 117a during this return movement sliding idly over the ratchet teeth of the combined ratchet and gear 121, said pawl 117a being held against the ratchet wheel by a spring (not shown).

A conductor 122, connected to line conductor 71, is connected through a brush 123 with a conconductive ring 124 on the disk 101, and through the ring with disk contact 97. This ring 124, when the parts are in the Fig. 3 position, is connected through contacts 97 and 93 with a conductor 125 which goes to the armature of the motor 12. From the armature the current travels over a conductor 126 through contacts 96 and 100 to a ring 127 of the disk 101. The circuit is completed through a brush 128 and conductors 129 and 130 to line conductor 68.

Line conductor 71 is also connected through conductor 122 and a branch conductor 131 to a brush 132, which runs in engagement with a conductive ring 133 of the disk 101. The ring 133 is connected in turn to contact 98 which, through contact 94, transmits current to a conductor 134, which goes to the field winding 135 of the motor 12. From the field winding 135 the current is transmitted over a conductor 136 to contacts 95 and 99. The contact 99 is connected to a conductive ring 137 of the disk 101, which runs in engagement with a brush 138. The brush 138 is connected through the conductor 130 with line conductor 68.

It will be seen that the movement of the disk 101 into the position illustrated in Fig. 3 causes both the field and armature circuits of the motor 12 to be completed, and as a consequence the motor is operated to drive the pinion 14 in a direction to raise the rack 10.

As the rack starts upward, the pick-up 20 is held back by the winding 91, which is energized at this time. The condition of the parts illustrated in Fig. 3 is that which exists on the upward stroke just after the winding 91 has been deenergized.

At the start of the up-stroke a projection 139 at the upper end of the rack 10 is in engagement with the lower end of a downwardly extending arm 140 of a bellcrank switch lever 141. The projection 139, acting on the arm 140, maintains the switch arm 142 of the bell crank 141 in engagement with a contact 143. The right-hand face of the arm 140 in the described condition of the parts extend straight and in a direction parallel to the direction of movement of the rack 10 to maintain the switch arm 142 in the closed condition during the initial upward movement of the rack 10.

With the parts in the condition just described the circuit is completed through the winding 91 as follows:

From line conductor 71 current passes through a conductor 144, contact 143, switch 142, conductor 145, conductor 146, winding 91, and finally conductor 147 back to line conductor 68.

As the rack 10 moves upward carrying the bail 8 and the upper margin of the selected frame 5 past the pick-up 20, and just after the upper margin has cleared the pick-up, the projection 139 comes opposite a cut-out 148 in the arm 140. This permits the switch member 142 to move to an open position as illustrated in Fig. 3, so that the winding 91 is deenergized and the pick-up 20 is caused by the spring 88 to swing into proximity to the selected one of the wires 6. As the rack continues to travel upward, the information recorded on the wire 6 is transmitted by the pick-up over conductors 150 and 151.

As the rack 10 nears its upward limit of movement, the upper face of the projection 139 engages a bar 152 supported at opposite ends by arms 152a rigid on a rock shaft 153. The rock shaft has an arm 153a which bears against the upper face of a switch member 154. As the bar 152 is operated counter-clockwise by the projection 139, the switch member 154 is swung to a closed position by the arm 153a. This completes a circuit from line conductor 71 through a conductor 155, switch 154, conductors 156 and 112, electromagnet winding 113, and conductor 116, back to line conductor 68.

The pawl arm 117 is accordingly drawn upwardly through its full operating stroke to advance the contacts 97, 108, 98, 99 and 100 through another step of 120° into engagement, respectively, with contacts 104, 109, 105, 106 and 107. This shift is effective to reverse the direction of operation of the motor 12 and to re-energize the winding 91, as will now be explained.

The energizing circuit for winding 91 may be traced out from line conductor 71 through conductor 122, branch conductor 122a, brush 122b, ring 122c, contacts 108 and 109, conductors 122d and 146, winding 91, and conductor 147 back to line conductor 68.

The circuit through the motor armature may be traced out from line conductor 71 to conductor 122, brush 123, ring 124, contacts 97 and 104, conductors 157, and 125 to the armature, thence over conductors 126 and 158, contacts 107 and 100, ring 127, brush 128 and conductors 129 and 130 back to line conductor 68.

The circuit through the field winding 135 is in the opposite direction from that previously described. The circuit may be traced from line conductor 71 through conductors 122 and 131, brush 132, ring 133, contacts 98 and 105, conductor 136, winding 135, conductors 134 and 159, contacts 106 and 99, ring 137, brush 138 and conductor 130 to line conductor 68.

As soon as the reverse operation of the motor begins, the rack 10 starts to move downward, and the projection 139 is carried out of engagement with the bar 152 permitting the switch member 154 to return to its open position. As soon as the switch member returns to its open position, the winding 113 of electromagnet 114 is de-energized and the pawl arm 117 is permitted to perform its downward or idle stroke returning to engagement with the stop 119.

As the rack continues downward the selected wire is carried downward past the pick-up 20, but the pick-up is held retracted out of the range of influence of the wire, so that no impulses are transmitted by the pick-up. This is especially important if code impulses are recorded rather than speech. Speech in reverse is unintelligible and, therefore, readily distinguishable from the clear information given as the wire is carried upward. Code impulses in reverse, when applied to mechanism designed to be responsive to code impulses, produce spurious operation which is likely to confuse or misinform the operator.

As the rack nears its lower limit of movement, the projection 139 re-engages the arm 140 to actuate the bell crank 141, shifting the switch arm 142 again to its closed condition. For the remainder of the downward movement this merely provides an additional path from line conductor 71 to winding 91 for holding the pick-up away from the wire and frame. At the conclusion of the downward movement it serves to maintain the coil 91 energized.

As the rack arrives substantially at its lower limit of movement, the lower face of the projection 139 engages a bar 160 supported by two arms 160*a* rigid on a rock shaft 161 pivoted upon the main frame. An arm 161*a* of the rock shaft 161 engages the lower side of a switch member 162, and in response to the motion imparted by the projection 139 raises the switch member 162 to a closed condition. This closes a circuit through the winding 113 to impart a third step of 120° to the disk 101. The circuit through the winding 113 may in this case be traced from line conductor 71 through conductor 122, ring 124, contacts 97 and 104, conductors 157 and 125, conductor 163, switch 162, conductors 156 and 112, winding 113 and finally conductor 116 back to line conductor 68.

As the disk 101 moves forward through its final step of 120°, the contact 97 is carried out of engagement with the contact 104, thus breaking the circuit through the winding 113. The pawl arm 117 is, therefore, permitted to return to its normal position. At the conclusion of the third step all of the parts are restored to their initial positions, so that when desired a new cycle can be brought about simply by the instantaneous closing of the switch 110.

After the motor 12 has been operated through a complete cycle in the manner described, it is desirable and at times necessary to return the main carriage 11 and the sub-carriage 21 to their original starting positions.

It will be remembered that throughout the forward operation of the main carriage, the circuit comprising conductors 31 and 32 was energized, but that this circuit was automatically de-energized as the predetermined counter passed from 99 to 00. An electromagnet 171 (Fig. 2) connected to the conductors 31 and 32 through branch conductors 172 and 173 serves to hold open a switch 174 throughout the forward operation of the motor. It is essential that this switch be closed throughout the return operation of the motor 33 and the main carriage 11, as will presently appear.

The switch 174 is included in a circuit which comprises a conductor 175, the switch 174, a conductor 176, an electromagnet 177 and a conductor 178. This circuit is energized at all times saved when the switch 174 is open. The electromagnet 177 acts upon a switch 179 which is included in the field circuit employed during the return or restoring operation of the motor.

With the de-energization of the electromagnet 171 upon the arrival of the main carriage at the selected position, the switch 174 closes, and through the electromagnet 117 causes the switch 179 to close. This conditions the parts for the reverse operation.

When the switch handle 63 (Fig. 2) is now swung to the right to the "Reverse" position, the switch members 65, 66 and 67 are carried into engagement, respectively, with stationary contacts 180, 181 and 182. The armature circuit thus established is substantially the same as before. It may be traced from line conductor 68 through conductor 69 to switch member 65, contact 180, conductor 78, the armature itself and conductor 73 back to line conductor 71.

The field circuit may be traced from line conductor 68 through conductors 69 and 70, switch member 66, contact 181, conductor 83, field winding 82, conductor 81, switch member 179, conductor 183, contact 182, switch member 67, conductor 72 and conductor 73, back to line conductor 71. This causes the motor to operate in the reverse direction.

As it does so, the bar 49 is moved toward the right (Fig. 2) and near the end of its reverse or restoring movement carries an abutment 184 into engagement with a tail portion 185 of the switch 174. This moves the switch 174 to an open condition, causing the motor field circuit to be broken, so that the motor is caused to come to rest.

The motor cannot now be further operated in eithe rdirection until a number other than 00 has been set up in the predetermined counter. When that occurs, the circuit comprising conductors 31 and 32 is re-energized, and the switch 59 is drawn closed to condition the forward operating circuit for operation upon movement of the switch handle 63 to the forward position. The switch 174 continues to be held open by the abutment 184, so long as the bar 49 remains in the normal idle position. As the bar 49 moves forward, the abutment 184 leaves engagement with the switch 174, but the switch continues then to be held open by the electromagnet 171.

It will be observed that the electromagnet 47 is maintained unenergized throughout the reverse operation of the main carriage, so that the impulse transmitter 37 is inactive to transmit impulses into the counter during the reverse or restoring operation, the finger 36 being disengaged from the rack 35. Thus the 00 setting of the counter mechanism is mentioned. When the carriage has been restored, however, and a count other than 00 has been set up in the predetermined counter, the electromagnet 47 is re-energized and causes the impulse transmitter 37 to be again rendered and maintained effective during the ensuing forward operation of the carriage.

The description of the mechanism of Fig. 2 both as to its construction and operation with respect to the restoring operation is applicable equally to the operation of the motor 33 which drives the main carriage, and to the operation of the motor 33*y* which drives the sub-carriage.

To summarize briefly, with both carriages 11 and 21 in their initial positions and both predetermined counters 24 standing at 00, selected numbers are set up by the operation of the dials 25 and 26 of the two predetermined counters. In each instance the switch 30 (Fig. 2) is instantaneously closed to run the set-up number in to the associated counter mechanism.

The switch handle 63 for controlling the motor 33 is then swung to its "Forward" position. The switch handle 63 for controlling the motor 33*y* may be simultaneously swung to its forward position if desired, so that the two selecting operations may progress simultaneously.

When the selections have been thus effected, the switch 110 (Fig. 3) is closed to cause the motor 12 and its associated rack to go through their complete operating cycle. As soon as this cycle is complete, the motor operating switch handles 63 may be swung simultaneously to their "Reverse" positions to restore both the carriage 11 and the subcarriage 21 simultaneously to the initial condition.

The parts are now ready for the running of new numbers into the predetermined counters and a repetition of the entire sequence of operations described.

I have described what I believe to be the best embodiment of my invention. I do not wish, however, to be confined to the embodiment shown, but what I desire to cover by Letters Patent is set forth in the appended claims.

I claim:

1. In an information storing, selecting and reproducing system, in combination, a large number of magnetizable record tracks supported in parallel relation to one another and arranged in lines, a magnetic pick-up for cooperating with any one of the tracks to be selected, a selector comprising a predetermined counter, means for setting up a selected number in the counter, an impulse generator constructed and arranged to transmit a counting impulse to the counter for each line passed, a carriage for moving the pick-up, a carriage driving motor, mechanism responsive to the counter at a predetermined point in the cycle thereof to deenergize the motor and arrest the carriage, means for operating the motor in a reverse direction to restore the carriage to its starting position, and means for holding the impulse generator inactive during the restoring operation.

2. In an information storing, selecting and reproducing system, in combination, a large number of magnetizable record tracks supported in parallel relation to one another and arranged in lines, a magnetic pick-up for cooperating with any one of the tracks to be selected, a selector comprising a predetermined counter, means for setting up a selected number in the counter, a carriage for moving the pick-up, a ratchet bar on the carriage, an impulse generator connected to transmit a counting impulse to the counter for each line of record tracks passed by said pick-up, a stop cooperative with the ratchet bar to arrest forward movement of the carriage, and electromagnetic mechanism normally holding the stop inactive during advancing movement of the carriage, but responsive to the attainment of a predetermined count in the counter to shift the stop to an effective position.

3. In an information storing, selecting and reproducing system, in combination, a magazine member containing a large number of magnetizable record tracks supported in parallel relation to one another and arranged in lines, a magnetic pick-up member for cooperating with any one of the record tracks to be selected, one of said members being movable relative to the other, means for setting up a selected number in a counter, an impulse generator constructed and arranged to transmit a counting impulse to said counter for each line passed, a motor for driving the movable member in forward and reverse directions, mechanism responsive to said counter at a predetermined point in the cycle thereof to arrest forward drive of the motor, and limiting mechanism automatically effective at a predetermined point in the travel of the movable member to arrest reverse movement thereof.

4. An information storing, selecting and reproducing system comprising, in combination, a magazine having a multiplicity of magnetizable record tracks supported in parallel relation to one another and arranged in rows and columns, a magnetic pick-up for cooperating with any one of the tracks to be selected, mechanism for relatively moving the selected record track and the pick-up lengthwise of the track, and control mechanism comprising a manually operable control member and means automatically responsive to said member to cause such relative movement to be effected first in one direction, then to be automatically reversed, and finally to be arrested when the initial relation of the parts has been restored.

5. An information storing, selecting and reproducing system as set forth in claim 4 in which a pick-up carrier is provided and the pick-up is movably mounted upon the carrier with capacity for movement between an advanced operative position, and a retracted inoperative position, and which further includes means for causing the pick-up to be retracted throughout relative movement of the pick-up and the record track in one direction and to be advanced throughout the major portion at least of such relative movement in the opposite direction.

6. An information storing, selecting and reproducing system comprising, in combination, a magazine having a multiplicity of record frames each including a multiplicity of record tracks arranged in parallel relation, a magnetic pick-up for cooperating with any one of the tracks to be selected, mechanism for shifting the pick-up to select a particular frame and a particular track of the frame, a frame lifter shiftable with the pick-up in the frame selecting movement, a carrier for the pick-up upon which the pick-up is movably mounted with capacity for movement between an advanced operative position and a retracted inoperative position, and means for holding the pick-up retracted until the lifter and the upper margin of the frame have been carried upward clear of the pick-up and for then shifting the pick-up into operative position in close proximity to the selected track.

7. An information storing, selecting and reproducing system as set forth in claim 6 in which mechanism is provided for automatically reversing the direction of movement of the lifter at the conclusion of the lifting movement and other mechanism is provided for causing the pick-up to be retracted throughout the downward movement of the lifter.

References Cited in the file of this patent

UNITED STATES PATENTS

| Number | Name | Date |
|---|---|---|
| 1,715,666 | McCoy | June 4, 1929 |
| 2,080,100 | Tauchek | May 11, 1937 |
| 2,167,459 | Long | July 25, 1939 |
| 2,435,066 | Barsh | Jan. 27, 1948 |
| 2,481,398 | Danisch | Sept. 6, 1949 |
| 2,517,559 | Haight et al. | Aug. 8, 1950 |
| 2,528,161 | Miloche | Oct. 31, 1950 |
| 2,540,654 | Cohen et al. | Feb. 6, 1951 |
| 2,620,389 | Potter | Dec. 2, 1952 |

OTHER REFERENCES

Electronics, Mar. 1947, pp. 120–123, "Predetermined Counters."